US008218765B2

(12) United States Patent
Proudler et al.

(10) Patent No.: US 8,218,765 B2
(45) Date of Patent: Jul. 10, 2012

(54) INFORMATION SYSTEM

(75) Inventors: Graeme John Proudler, Bristol (GB); Boris Balacheff, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2826 days.

(21) Appl. No.: 10/080,476

(22) Filed: Feb. 22, 2002

(65) Prior Publication Data
US 2002/0120862 A1    Aug. 29, 2002

(30) Foreign Application Priority Data
Feb. 23, 2001 (GB) .................................. 0104584.8

(51) Int. Cl.
*H04K 1/00* (2006.01)
(52) U.S. Cl. ............... 380/258; 380/270; 726/1; 726/2; 726/3; 726/20; 726/26; 713/150; 713/155
(58) Field of Classification Search ............... 455/418, 455/456.1, 414.1, 404.1, 404.2, 440, 457–458, 455/411, 420; 709/201, 217, 223, 218, 202–203, 709/229; 713/201, 153, 150, 155; 705/74, 705/50, 712; 340/995, 988; 380/258, 278, 380/286, 30, 270; 726/3, 1, 20, 26, 2; 707/9, 707/5, 25, E17.018; 370/316; 716/1; 342/457, 342/463, 464; 715/712
See application file for complete search history.

(56) References Cited

U.S. PATENT DOCUMENTS

| | | | |
|---|---|---|---|
| 4,747,040 A | 5/1988 | Blanset et al. | |
| 4,799,156 A | 1/1989 | Shavit et al. | |
| 4,926,476 A | 5/1990 | Covey | |
| 4,933,969 A | 6/1990 | Marshall et al. | |
| 4,962,533 A | 10/1990 | Krueger et al. | |
| 4,984,272 A | 1/1991 | McIlroy | |
| 5,029,206 A | 7/1991 | Marino et al. | |
| 5,032,979 A | 7/1991 | Hecht et al. | |
| 5,038,281 A | 8/1991 | Peters | |
| 5,136,711 A | 8/1992 | Hugard et al. | |
| 5,144,660 A | 9/1992 | Rose | 380/4 |
| 5,261,104 A | 11/1993 | Bertram et al. | |
| 5,278,973 A | 1/1994 | O'Brien et al. | |
| 5,283,828 A | 2/1994 | Saunders et al. | 713/192 |
| 5,325,529 A | 6/1994 | Brown et al. | |
| 5,341,422 A | 8/1994 | Blackledge et al. | 726/5 |

(Continued)

FOREIGN PATENT DOCUMENTS

CA    2187855    6/1997

(Continued)

OTHER PUBLICATIONS

"System for Detecting Undesired Alteration of Software," *IBM Technical Disclosure Bulletin*, vol. 32, No. 11, pp. 48-50 (Apr. 1990).

(Continued)

*Primary Examiner* — Thanhnga Truong

(57) ABSTRACT

A trusted service which publishes information describing security attributes of computing platforms in a defined physical area, for use by a visitor to a building, for example, who is unfamiliar with the computing platforms available for use therein. In a preferred embodiment, the system provides only details and/or a list of public keys of genuine trusted computing platforms within the area.

In another embodiment of the invention, the information system comprises a trusted computing platform for providing selected information to a user's portable computing apparatus.

20 Claims, 6 Drawing Sheets

U.S. PATENT DOCUMENTS

| | | | |
|---|---|---|---|
| 5,359,659 A | 10/1994 | Rosenthal | |
| 5,361,359 A | 11/1994 | Tajalli et al. | |
| 5,379,342 A | 1/1995 | Arnold et al. | |
| 5,404,532 A | 4/1995 | Allen et al. | |
| 5,410,707 A | 4/1995 | Bell | |
| 5,414,860 A | 5/1995 | Canova et al. | |
| 5,421,006 A | 5/1995 | Jablon et al. | |
| 5,440,723 A | 8/1995 | Arnold et al. | |
| 5,444,850 A | 8/1995 | Chang | |
| 5,448,045 A | 9/1995 | Clark | 235/382 |
| 5,454,110 A | 9/1995 | Kannan et al. | |
| 5,473,692 A | 12/1995 | Davis | |
| 5,483,649 A | 1/1996 | Kuznetsov et al. | |
| 5,491,750 A | 2/1996 | Bellare et al. | 713/155 |
| 5,495,569 A | 2/1996 | Kotzur | |
| 5,497,490 A | 3/1996 | Harada et al. | |
| 5,497,494 A | 3/1996 | Combs et al. | |
| 5,504,814 A | 4/1996 | Miyahara | |
| 5,504,910 A | 4/1996 | Wisor et al. | |
| 5,511,184 A | 4/1996 | Lin | 10/261 |
| 5,530,758 A | 6/1996 | Marino et al. | |
| 5,535,411 A | 7/1996 | Speed et al. | |
| 5,548,763 A | 8/1996 | Combs et al. | |
| 5,555,373 A | 9/1996 | Dayan et al. | |
| 5,572,590 A | 11/1996 | Chess | |
| 5,619,571 A | 4/1997 | Sandstrom et al. | |
| 5,680,452 A | 10/1997 | Shanton | |
| 5,680,547 A | 10/1997 | Chang | |
| 5,692,124 A | 11/1997 | Holden et al. | |
| 5,694,590 A | 12/1997 | Thuraisingham et al. | |
| 5,701,343 A | 12/1997 | Takashima et al. | 705/51 |
| 5,706,431 A | 1/1998 | Otto | 709/221 |
| 5,768,382 A | 6/1998 | Schneier et al. | |
| 5,771,354 A | 6/1998 | Crawford | |
| 5,774,717 A | 6/1998 | Porcaro | 707/202 |
| 5,787,175 A | 7/1998 | Carter | |
| 5,809,145 A | 9/1998 | Slik et al. | |
| 5,815,665 A | 9/1998 | Teper et al. | |
| 5,815,702 A | 9/1998 | Kannan et al. | 712/244 |
| 5,819,261 A | 10/1998 | Takahashi et al. | 707/3 |
| 5,841,868 A * | 11/1998 | Helbig, Sr. | 235/380 |
| 5,841,869 A | 11/1998 | Merkling et al. | 713/164 |
| 5,844,986 A | 12/1998 | Davis | |
| 5,845,068 A | 12/1998 | Winiger | |
| 5,867,646 A | 2/1999 | Benson et al. | |
| 5,887,163 A | 3/1999 | Nguyen et al. | |
| 5,889,989 A | 3/1999 | Robertazzi et al. | |
| 5,890,142 A | 3/1999 | Tanimura et al. | 706/12 |
| 5,892,900 A | 4/1999 | Ginter et al. | 726/26 |
| 5,892,902 A | 4/1999 | Clark | 726/5 |
| 5,903,732 A | 5/1999 | Reed et al. | |
| 5,917,360 A | 6/1999 | Yasutake | |
| 5,922,074 A | 7/1999 | Richard et al. | |
| 5,933,498 A | 8/1999 | Schneck et al. | |
| 5,937,066 A * | 8/1999 | Gennaro et al. | 380/286 |
| 5,937,159 A | 8/1999 | Meyers et al. | 713/201 |
| 5,940,513 A | 8/1999 | Aucsmith et al. | 713/187 |
| 5,958,016 A * | 9/1999 | Chang et al. | 709/229 |
| 5,960,177 A | 9/1999 | Tanno | |
| 5,966,732 A | 10/1999 | Assaf | 711/710 |
| 5,987,605 A | 11/1999 | Hill et al. | |
| 5,987,608 A | 11/1999 | Roskind | |
| 6,006,332 A | 12/1999 | Rabne et al. | |
| 6,012,080 A | 1/2000 | Ozden et al. | |
| 6,021,510 A | 2/2000 | Nachenberg | 714/38 |
| 6,023,765 A | 2/2000 | Kuhn | |
| 6,038,667 A | 3/2000 | Helbig | 726/16 |
| 6,067,559 A | 5/2000 | Allard et al. | |
| 6,078,948 A | 6/2000 | Podgorny et al. | |
| 6,079,016 A | 6/2000 | Park | |
| 6,081,830 A | 6/2000 | Schindler | |
| 6,081,894 A | 6/2000 | Mann | 713/188 |
| 6,091,956 A * | 7/2000 | Hollenberg | 455/456.5 |
| 6,098,133 A | 8/2000 | Summers et al. | 710/107 |
| 6,100,738 A | 8/2000 | Illegems | |
| 6,115,819 A * | 9/2000 | Anderson | 726/20 |
| 6,125,114 A | 9/2000 | Blanc et al. | |
| 6,138,239 A | 10/2000 | Veil | |
| 6,154,838 A | 11/2000 | Le et al. | |
| 6,157,719 A | 12/2000 | Wasilewski et al. | |
| 6,175,917 B1 | 1/2001 | Arrow et al. | |
| 6,185,678 B1 | 2/2001 | Arbaugh et al. | |
| 6,211,583 B1 | 4/2001 | Humphreys | |
| 6,253,193 B1 | 6/2001 | Ginter et al. | |
| 6,253,324 B1 | 6/2001 | Field et al. | 713/187 |
| 6,253,349 B1 | 6/2001 | Maeda et al. | 714/799 |
| 6,266,774 B1 | 7/2001 | Sampath et al. | 713/201 |
| 6,272,631 B1 | 8/2001 | Thomlinson | |
| 6,275,848 B1 | 8/2001 | Arnold | |
| 6,289,462 B1 | 9/2001 | McNabb et al. | 713/201 |
| 6,292,900 B1 | 9/2001 | Ngo et al. | |
| 6,304,970 B1 | 10/2001 | Bizzara et al. | |
| 6,327,533 B1 * | 12/2001 | Chou | 701/207 |
| 6,327,579 B1 | 12/2001 | Crawford | |
| 6,327,652 B1 | 12/2001 | England et al. | 713/2 |
| 6,330,669 B1 | 12/2001 | McKeeth | |
| 6,330,670 B1 | 12/2001 | England et al. | 713/2 |
| 6,334,118 B1 | 12/2001 | Benson | |
| 6,367,012 B1 | 4/2002 | Atkinson et al. | |
| 6,374,250 B2 | 4/2002 | Ajtai et al. | 707/101 |
| 6,393,412 B1 | 5/2002 | Deep | |
| 6,393,556 B1 | 5/2002 | Arora | |
| 6,405,318 B1 | 6/2002 | Rowland | 713/200 |
| 6,414,635 B1 * | 7/2002 | Stewart et al. | 342/457 |
| 6,446,206 B1 | 9/2002 | Aguilar et al. | |
| 6,449,716 B1 | 9/2002 | Rickey | |
| 6,477,702 B1 | 11/2002 | Yellin et al. | |
| 6,487,601 B1 | 11/2002 | Hubacher et al. | |
| 6,496,847 B1 | 12/2002 | Bugnion et al. | |
| 6,505,300 B2 | 1/2003 | Chan et al. | |
| 6,507,909 B1 | 1/2003 | Zurko et al. | 713/164 |
| 6,510,418 B1 | 1/2003 | Case et al. | 705/26 |
| 6,513,156 B2 | 1/2003 | Bak et al. | |
| 6,519,623 B1 | 2/2003 | Mancisidor | |
| 6,529,143 B2 * | 3/2003 | Mikkola et al. | 340/995.1 |
| 6,529,728 B1 * | 3/2003 | Pfeffer et al. | 455/418 |
| 6,530,024 B1 | 3/2003 | Proctor | |
| 6,539,425 B1 | 3/2003 | Stevens et al. | 709/220 |
| 6,609,199 B1 | 8/2003 | DeTreville | 713/172 |
| 6,609,248 B1 | 8/2003 | Srivastava et al. | |
| 6,622,018 B1 | 9/2003 | Erekson | |
| 6,650,902 B1 * | 11/2003 | Richton | 455/456.3 |
| 6,654,800 B1 * | 11/2003 | Rieger, III | |
| 6,671,716 B1 | 12/2003 | Diedrichsen et al. | |
| 6,678,827 B1 | 1/2004 | Rothermel et al. | 726/6 |
| 6,678,833 B1 | 1/2004 | Grawrock | 713/401 |
| 6,681,304 B1 | 1/2004 | Vogt et al. | |
| 6,694,434 B1 | 2/2004 | McGee et al. | 713/189 |
| 6,697,944 B1 | 2/2004 | Jones et al. | 713/168 |
| 6,701,440 B1 | 3/2004 | Kim et al. | |
| 6,716,101 B1 * | 4/2004 | Meadows et al. | 455/456.1 |
| 6,732,276 B1 | 5/2004 | Cofler et al. | |
| 6,751,680 B2 | 6/2004 | Langerman et al. | |
| 6,757,824 B1 | 6/2004 | England | 713/156 |
| 6,757,830 B1 | 6/2004 | Tarbotton et al. | |
| 6,772,331 B1 * | 8/2004 | Hind et al. | 713/151 |
| 6,775,779 B1 | 8/2004 | England et al. | |
| 6,785,015 B1 | 8/2004 | Smith et al. | 358/1.15 |
| 6,799,270 B1 | 9/2004 | Bull et al. | 713/153 |
| 6,837,229 B2 | 1/2005 | Mizutani et al. | |
| 6,853,988 B1 | 2/2005 | Dickinson et al. | 705/75 |
| 6,868,406 B1 | 3/2005 | Ogg et al. | 705/153 |
| 6,889,325 B1 | 5/2005 | Sipman et al. | 713/176 |
| 6,892,307 B1 | 5/2005 | Wood et al. | |
| 6,931,545 B1 | 8/2005 | Ta et al. | |
| 6,948,069 B1 | 9/2005 | Teppler | |
| 6,948,073 B2 | 9/2005 | England et al. | 380/201 |
| 6,965,816 B2 | 11/2005 | Walker | |
| 6,988,250 B1 | 1/2006 | Proudler et al. | |
| 7,051,343 B2 | 5/2006 | Bracha et al. | |
| 7,076,655 B2 | 7/2006 | Griffin et al. | |
| 7,076,804 B2 | 7/2006 | Kershenbaum et al. | |
| 7,159,210 B2 | 1/2007 | Griffin et al. | |
| 7,181,608 B2 | 2/2007 | Fallon et al. | |
| 7,194,623 B1 | 3/2007 | Proudler et al. | |
| 7,302,698 B1 | 11/2007 | Proudler et al. | |
| 7,529,919 B2 | 5/2009 | Lampson et al. | |

| | | |
|---|---|---|
| 7,669,238 B2 | 2/2010 | Fee et al. |
| 7,865,876 B2 | 1/2011 | Griffin et al. |
| 7,877,799 B2 | 1/2011 | Proudler |
| 2001/0037450 A1 | 11/2001 | Metlitski et al. ............. 713/152 |
| 2001/0051515 A1 | 12/2001 | Rygaard ...................... 455/410 |
| 2002/0012432 A1 | 1/2002 | England et al. ............... 380/231 |
| 2002/0023212 A1 | 2/2002 | Proudler ...................... 713/164 |
| 2002/0089528 A1* | 7/2002 | Hay et al. ..................... 345/712 |
| 2002/0095454 A1 | 7/2002 | Reed et al. ................... 709/201 |
| 2002/0120575 A1 | 8/2002 | Pearson et al. |
| 2002/0120876 A1 | 8/2002 | Pearson et al. |
| 2002/0184488 A1 | 12/2002 | Amini et al. .................. 713/153 |
| 2002/0184520 A1 | 12/2002 | Bush et al. |
| 2003/0009685 A1 | 1/2003 | Choo et al. |
| 2003/0014466 A1 | 1/2003 | Berger et al. |
| 2003/0018892 A1 | 1/2003 | Tello ............................ 713/164 |
| 2003/0037237 A1 | 2/2003 | Abgrall et al. ................ 713/166 |
| 2003/0084436 A1 | 5/2003 | Berger et al. |
| 2003/0145235 A1 | 7/2003 | Choo |
| 2003/0191957 A1 | 10/2003 | Hypponen et al. |
| 2003/0196083 A1 | 10/2003 | Grawrock et al. |
| 2004/0073617 A1 | 4/2004 | Milliken et al. |
| 2005/0256799 A1 | 11/2005 | Warsaw et al. |

FOREIGN PATENT DOCUMENTS

| | | |
|---|---|---|
| EP | 0 304 033 A2 | 2/1989 |
| EP | 0421409 | 4/1991 |
| EP | 0510224 A1 | 10/1992 |
| EP | 0 580 350 A1 | 1/1994 |
| EP | 0 825 511 A2 | 2/1998 |
| EP | 0 849 657 A1 | 6/1998 |
| EP | 08-49680 | 6/1998 |
| EP | 0 465 016 B1 | 12/1998 |
| EP | 0893751 A1 | 1/1999 |
| EP | 0 895 148 A1 | 2/1999 |
| EP | 0926605 | 6/1999 |
| EP | 0992958 A2 | 4/2000 |
| EP | 1 030 237 A1 | 8/2000 |
| EP | 1 056 014 A1 | 11/2000 |
| EP | 1049036 | 11/2000 |
| EP | 1055990 | 11/2000 |
| EP | 1056010 A1 | 11/2000 |
| EP | 1076279 A1 | 2/2001 |
| EP | 1085396 A1 | 2/2001 |
| EP | 1107137 A2 | 6/2001 |
| GB | 2317476 A | 3/1998 |
| GB | 2 336 918 | 11/1999 |
| GB | 2336918 A1 | 11/1999 |
| GB | 2 353 885 A | 3/2001 |
| GB | 2361153 A | 10/2001 |
| JP | 9214493 | 8/1997 |
| JP | 10083382 | 3/1998 |
| JP | 10293704 | 10/1998 |
| JP | 10510647 | 10/1998 |
| JP | 10293705 | 11/1998 |
| JP | 11003248 | 1/1999 |
| JP | 2001-0016655 | 1/2001 |
| WO | 93/25024 | 12/1993 |
| WO | 94/11967 | 5/1994 |
| WO | 95/24696 | 9/1995 |
| WO | 95/27249 | 10/1995 |
| WO | 97/29416 | 8/1997 |
| WO | 98/26529 | 6/1998 |
| WO | 98/36517 | 8/1998 |
| WO | 98/40809 | 9/1998 |
| WO | 98/45778 | 10/1998 |
| WO | PCT/US1998/015082 | 2/1999 |
| WO | PCT/US1998/044402 | 2/1999 |
| WO | 00/31644 | 6/2000 |
| WO | PCT/US2000/019324 | 7/2000 |
| WO | PCT/US2000/073880 | 7/2000 |
| WO | 00/48062 | 8/2000 |
| WO | 00/48063 | 8/2000 |
| WO | 00/54125 | 9/2000 |
| WO | 00/54126 | 9/2000 |
| WO | PCT/US2000/052900 | 9/2000 |
| WO | PCT/US2000/058859 | 10/2000 |
| WO | 00/73913 A1 | 12/2000 |
| WO | PCT/US2000/073904 | 12/2000 |
| WO | PCT/US2001/013198 | 2/2001 |
| WO | 01/23980 | 4/2001 |
| WO | PCT/US2001/027722 | 4/2001 |
| WO | PCT/US2001/065334 | 9/2001 |
| WO | PCT/US2001/065366 | 9/2001 |

OTHER PUBLICATIONS

Bontchev, V., "Possible Virus Attacks Against Integrity Programs and How to Prevent Them," *Virus Bulletin Conference*, pp. 131-141 (Sep. 1992).

Radai, Y., "Checksumming Techniques for Anti-Viral Purposes," *Virus Bulletin Conference*, pp. 39-68 (Sep. 1991).

Intel, "Wired for Management Baseline specification v2.0," *Boot Integrity Services Application Programming Interface Version 1.0*, 64 pages (Dec. 28, 1998).

"Information technology—Security techniques—Entity Authentication—Part 3: Mechanisms using digital signature techniques," *ISO/IEC 9798-3*, 6 pages (1998).

"Information technology—Security techniques—Key management—Part 3: Mechanisms using asymmetric techniques," *ISO/IEC 11770-3*, pp. 1-23 and Annexes A-E (1999).

The Trusted Computing Platform Alliance, "Building a Foundation of Trust in the PC," 9 pages, located at Internet address <www.trustedpc.org/home/home.html> (Jan. 2000).

Trusted Computing Platform Alliance, Main Specification, Version 1.0, 284 pages (Jan. 25, 2001).

Anderson, R., et al., "Tamper Resistance—a Cautionary Note," *ISENIX Association, Second USENIX Workshop on Electronic Commerce*, pp. 1-11 (Nov. 18-21, 1996).

Naor, M., et al., "Secure and Efficient Metering," Internet: <http://citeseer.nj.com/naor98secure.html> Sections 1-1.3 (1998).

Yee, B., "Using Secure Coprocessors," Doctoral thesis—Carnegie Mellon University, pp. 1-94 (May 1994).

"HP Virtualvault: Trusted Web-server Platform Product Brief," Internet: <http://www.hp.com/security/products/virtualvault/papers/brief_4.0/> pp. 1-6.

"NIST Announces Technical Correction to Secure Hash Standard," Internet: <http://www.nist.gov/public_affairs/releases/hashstan.htm> pp. 1-2 (Oct. 24, 2002).

"Secure Computing with JAVA™: Now and the Future," Internet: <http://java.sun.com/marketing/collateral/security.html> pp. 1-29 (Apr. 2, 2002).

U.S. Appl. No. 09/979,902, filed Nov. 27, 2001, Proudler et al.
U.S. Appl. No. 09/979,903, filed Nov. 27, 2001, Proudler et al.
U.S. Appl. No. 10/080,477, filed Feb. 22, 2002, Brown et al.
U.S. Appl. No. 10/080,478, filed Feb. 22, 2002, Pearson et al.
U.S. Appl. No. 10/080,479, filed Feb. 22, 2002, Pearson et al.
U.S. Appl. No. 10/194,831, filed Jul. 11, 2002, Chen et al.
U.S. Appl. No. 10/206,812, filed Jul. 26, 2002, Proudler.
U.S. Appl. No. 10/208,718, filed Jul. 29, 2002, Chen et al.

Schneier, B., et al., "Applied Cryptography, Second Edition", John Wiley and Sons, Inc. pp. 34-38.

U.S. Appl. No. 10/075,444, filed Feb. 15, 2002, Brown, et al.
U.S. Appl. No. 10/080,466, filed Feb. 22, 2002, Pearson, et al.
U.S. Appl. No. 10/080,476, filed Feb. 22, 2002, Proudler, et al.
U.S. Appl. No. 10/080,479, filed Feb. 22, 2002, Pearson, et al.
U.S. Appl. No. 10/165,840, filed Jun. 7, 2002, Dalton.
U.S. Appl. No. 10/175,185, filed Jun. 18, 2002, Pearson, et al.
U.S. Appl. No. 10/175,395, filed Jun. 18, 2002, Pearson, et al.
U.S. Appl. No. 10/240,137, filed Sep. 26, 2002, Dalton, et al.
U.S. Appl. No. 10/240,138, filed Sep. 26, 2002, Choo.
U.S. Appl. No. 10/240,139, filed Sep. 26, 2002, Choo, et al.
U.S. Appl. No. 10/303,690, filed Nov. 21, 2002, Proudler, et al.

"Building a Foundation of Trust in the PC," Trusted Computing Platform Alliance, pp. 1-7, Jan. 2000.

"Secure Execution Environments, Internet Safety through Type-Enforcing Firewalls," <http://www.ghp.com/research/nailabs/secure-execution/internet/safety.asp>, Retrieved Apr. 24, 2002.

Barkley, J., et al, "Managing Role/Permission Relationships Using Object Access Types," p. 73-80, Jul. 1998 ACM.

Berger, J. L., et al., "Compartmented Mode Workstation: Prototype Highlights" IEEE Transactions on Software Engineering, vol. 16, No. 6, Jun. 1990.

Boot Integrity Services Application Programming Interface, Version 1.0, Intel Corporation, pp. 1-60, Dec. 28, 1998.

Burke, J.P., "Security Suite Gives Sniffer Programs Hay Fever," HP Professionai, vol. 8, No. 9, 3 pages total, Sep. 1994.

Chalim, D., "Security Without Identification: Transaction Systems to Make Big Brother Obsolete," Communications of the ACM, vol. 28, No. 10, pp. 1030-1044, Oct. 1985.

Choo, T.H., et al., "Trusted Linux: A Secure Platform for Hosting Compartmented Applications," Enterprise Solutions, pp. 1-14 Nov.-Dec. 2001.

Dalton, C., et al., "An Operating System Approach to Securing E-Services," Communications of the ACM, vol. 44, Issue 2, Feb. 2001.

Dalton, C., et al., "Appiying Miiitary Grade Security to the Internet," Computer Network and ISND Systems, col. 29, pp. 1799-1808, 1997.

Dalton, C., et al., "Design of Secure UNIX," Elsevier Information Security Report, Feb. 1992.

EDS Timeline, the 1960's, at EDS.com, retrieved Jun. 16, 2006.

Ford, B., et al "Microkernels Meet Recursive Virtual Machines," Operating Systems Review, ACM, vol. 30, No. Special Issue, pp. 137-151, Dec. 21, 1996.

Goldberg, R.P., "Survey of Virtual Machine Research," IEEE Service Center, vol. 7, No. 6, pp. 34-45, Jun. 1974.

Grimm, R., et al, "Separating Access Control Policy, Enforcement, and Functionality in Extensible Systems," pp. 36-70, Feb. 2001, ACM.

Hallyn, S.E., et al., "Domain and Type Enforcement for Linux," <http://org/publications/library/proceedings/als2000/full_papers/hallyn_html/>, Retrieved Apr. 24, 2002.

Intel Corporation: "Chapter 3: Protected Mode Memory Management," Intel Architecture; Software Developer'S Manual, vol. 3: System Programming (Jan. 1, 1999).

Jaeger, T., et al, "Requirements of Role-Based Access Control to Prevent Piracy of Digital information,"Proceedings of the IEEE, vol. 87, No. 7, pp, 1239-1250, Juy 1999.

Loscocco, P., et al., "Integrating Flexible Support for Security Policies into the Linux Operating System," www.nsa.gov/selinux, Retrieved Apr. 24, 2002.

Milojicic, D., et al, "Process Migration," <http://www.hpl.hp.com/techreports/1999/HPL-1999-21.html.> pp. 1-48, Dec. 5, 1998.

"Secure Computing with Java: Now and the Future," <http://java.sun.com/marketing/collateral/security.html>, pp. 1-29, Apr. 2,2002.

Popek, J., "Formal Requirements for Virtualizable Third Generation Architectures," Communications of the Assoc. for Computing Machinery, ACM, vol. 17, No. 7, p. 412-421, Jul. 1974.

Scheibe, M., "TCPA Security: Trust your Platform!" Quarterly Focus PC Security, pp. 44-47, <http://www.silicon-trust.com/pdf/secure_pdf/Seite_44-47.pdf>, 2000.

Schneck, P.B., "Persistent Access Control to Prevent Piracy of Digital information," Proceedings of the IEEE, vol. 87, No. 7, pp. 1239-1250, Jul. 1999.

Senie, D., "Using the Sock_Packet mechanism in Linux to Gain Complete Control of an Ethernet Interface," http://www.senie.com/dan/technology/sock_packet.html, Retrieved Apr. 22, 2002.

Sophos Anti-Virus for Notes/Domino Release Notes, Version 2.0, pp. 1-2, <http://sphos.com/sophos/products/full/readmes/readnote.txt>, Retrieved Nov. 30, 2001.

Wiseman, S., et al, "The Trusted Path Between SMITE and the User," Proceedings 1998 IEEE Symposium on Security and Privacy, pp. 147-155, Apr. 18-21, 1988.

Zhang, X.N., "Secure Code Distribution," pp. 76-79, 1997 IEEE.

* cited by examiner

INFORMATION SYSTEM

CROSS REFERENCE TO RELATED APPLICATIONS

The subject matter of the present application may also be related to the following U.S. patent applications: "Data Event Logging in Computing Platform," Ser. No. 09/979,902, filed Nov. 27, 2001; "Data Integrity Monitoring in Trusted Computing Entity," Ser. No. 09/979,903, filed Nov. 27, 2001; "Trusted Computing Environment," Ser. No. 10/080,477, filed Feb. 22, 2002; "Method of and Apparatus for Investigating Transactions in a Data Processing Environment," Ser. No. 10/080,478, filed Feb. 22, 2002; "Method of and Apparatus for Ascertaining the Status of a Data Processing Environment," Ser. No. 10/080,479, filed Feb. 22, 2002; "Trusted Platform Evaluation," Ser. No. 10/194,831, filed Jul. 11, 2002; "Privacy of Data on a Computer Platform," Ser. No. 10/206,812, filed Jul. 26, 2002; and "Method and Apparatus for Locking an Application Within a Trusted Environment," Ser. No. 10/208,718, filed Jul. 29, 2002.

FIELD OF THE INVENTION

This invention relates to an information system and, in particular, to a system for providing information relating to a predetermined geographical area.

BACKGROUND TO THE INVENTION

Conventional prior art mass market computing platforms include personal computers, server computers, information appliances, communication devices, display devices, hard copy devices, and the like.

There is substantial potential, at least in theory, for widespread interaction between such computing platforms. However, because of the potential for fraud and manipulation of electronic data, such interaction and, in particular, fully automated transactions between such computing platforms are often avoided. The fundamental issue is one of trust between interacting computer platforms.

There have been several prior art schemes which are aimed at increasing the security and trustworthiness of computing platforms. Predominantly, these rely upon adding in security features at the application level, as opposed to building them into the fundamental hardware components of the computing platform, and although such prior art schemes go some way to improving the security of computer platforms, the levels of security and trust gained thereby may be considered insufficient for some applications in which greater confidence in the trustworthiness of the underlying technology may be required.

In the applicant's co-pending disclosures 'Trusted Computing Platform', filed at the European Patent Office on Feb. 15, 1999, the entire contents of which are incorporated herein by reference, and 'Computing Apparatus and Methods of Operating Computing Apparatus', there is disclosed a concept of a 'trusted computing platform' comprising a computing platform which has a 'trusted component' in the form of a built-in hardware and software component. Two computing entities, each provisioned with such a trusted component, may interact with each other with a high degree of 'trust'. That is to say, where the first and second computing entities interact with each other, the security of the transaction is enhanced compared to the case where no trusted component is present, because:

A user of a computing entity has higher confidence in the integrity and security of his/her own computer entity and in the integrity and security of the computer entity belonging to the other computing entity.

Each entity is confident that the other entity is in fact the entity which it purports to be.

Where one or both of the entities represent a party to a transaction, e.g. a data transfer transaction, because of the built-in trusted component, third party entities interacting with the entity have a high degree of confidence that the entity does in fact represent such a party.

The trusted component increases the inherent security of the entity itself, through verification and monitoring processes implemented by the trusted component.

The computer entity is more likely to behave in the way it is expected to behave.

However, if a first computer platform user enters a geographical area, for example, a building, in which the computer platforms are unfamiliar to him/her, the security attributes of such computer platforms will also be unknown. Thus, the user will be unaware of the computer platforms available for use, and also the degree of confidence with which he/she may interact therewith.

Existing methods of providing or publishing security information include a "Public Key Infrastructure" and key distribution systems.

In a Public Key Infrastructure, a certificate states certain attributes of a target and is signed by some previously trusted entity. A visitor to, for example, a building, obtains a certificate and is able to verify the authenticity of the certificate because of prior knowledge of the trusted entity. The visitor trusts the trusted entity, and therefore trusts the attributes (including security attributes) stated in the certificate.

In known key distribution schemes, the visitor receives keys of a target from a key distribution service. The key distribution service is expected to trust the visitor, and vice versa. Keys may be expected to be trusted by the visitor because they are signed by the key distribution service, and the visitor is able to verify such signatures. Keys may be rendered confidential because of intimate contact with a node of the key distribution service. Alternatively, keys may be rendered confidential because they are encrypted by the key distribution service, and the visitor is able to decrypt such data.

Many geographical areas have a central information point from which general information may be obtained by a visitor who is unfamiliar with that area. However, such information is usually only displayed on a screen for perusal by the visitor. There is usually no way of saving such information electronically in a user's computer platform, for example, for reference or use later, and even if there were, it is unlikely that the user would trust the integrity and security of the information point sufficiently to allow it to interact with his/her computer platform.

SUMMARY OF THE INVENTION

In accordance with a first aspect of the invention, there is provided an information system comprising an information access point relating to at least one predetermined geographical area, said information access point including apparatus for retrieving information relating to computing platforms located within said predetermined geographical area, together with security attributes of said computing platforms, said information system being arranged to provide said information to a user upon request.

Thus, a visitor to a building, for example, who is unfamiliar with the computing platforms available for use therein can obtain such information from a central information access point. In a preferred embodiment, the system provides only details and/or a list of public keys of genuine trusted computing platforms within the area, i.e. those including a 'trusted component'. In this case, the information system preferably also comprises a trusted computing platform.

Beneficially, the information system comprises means for communicating or interacting with a user's portable computing apparatus. Such apparatus may be in the form of a smart card, such that the information system includes a smart card reader, or, for example, a laptop computer or the like. In any event, it is preferable for communications between the information system and the user's portable computer apparatus to be unambiguous, such that the system preferably comprises a contact reader or directional wireless communication such as IR, for example.

If the information system is for use within an area owned by a private organisation, the system preferably includes means for verifying the identity of the user. However, if the system is for use in a publicly-owned area, such as a library or government building, then the system may preferably be arranged to provide the requested information indiscriminately upon request.

The system may include means to enable the user to perform operations, either locally or remotely, upon the information provided thereby.

Thus, in summary, the first aspect of the present invention provides a trusted service which publishes information describing security attributes of computing platforms in a defined physical area. Distribution of the information preferably requires intimate contact with a node of the information system. The information system may be indiscriminate and provide information on demand to any user, it may require identification of a user before distributing the requested information. Of course, various levels of information may be available to different levels of authority of a user.

In use, the information system is preferably presented to users accompanied by an explicit or implicit declaration by the provider of the service about the trustworthiness of the system and its information. Such a declaration may be implicit due. to the physical location of the system within the predefined area and/or it may be explicit by virtue of a statement located on or near the system. The declaration may be the primary or only basis of trust in the system and its information and, as such, the user is expected to base his/her trust of the system upon the basis of such a declaration. The declaration is preferably capable of interpretation by a user without preprocessing by an information processing system.

The system may provide an additional restricted set of services to the user, which may optionally permit the user to perform tests (either locally or remotely) on the information, thereby to increase confidence in the information about the computing platforms in the predefined area. The system is preferably arranged to erase all memory of a user's use of the system, to preserve the user's privacy. Such memory may be erased after a predetermined period of time, or upon the user's exit from the predefined area or on command. The system may also be arranged to delete upon command any information in the user's personal computing apparatus that was previously provided to the user's personal computing apparatus.

In a most preferred embodiment of the first aspect of the invention, the set of described computing platforms provided by the information system is restricted to 'trusted computing platforms'. Thus, the information system may comprise a smartcard reader that contains a list of public keys that identify trusted platforms within the vicinity. The list would preferably be signed by the attesting entity. When a visitor to an area wishes to use a trusted computing platform within that area, the visitor can use their personal smartcard to obtain details of genuine trusted computing platforms in the area and, optionally, verify such details before using the platforms. The visitor's smartcard thereafter knows which platforms in the vicinity are genuine trusted platforms.

In accordance with a second aspect of the present invention, there is provided an information system comprising a computing platform having a trusted component, apparatus for communicating with a user's portable computing apparatus, said information system being arranged to retrieve information relating to a predetermined geographical area and to communicate said information to said user's portable computing apparatus upon request.

Thus, the second aspect of the present invention provides a general information system which enables selected trustworthy information about an unfamiliar geographical area to be retrieved and distributed to a user's personal computing apparatus. Such information may relate to computing platforms within the area, as in the first aspect of the present invention, and the system may be arranged to provide a list of public keys of trusted computing platforms and/or a list of the public keys or the certificates of the public keys for other equipment. Thus, the system provides a key distribution service which may be implemented using a standard key distribution mechanism, for example, one of the mechanisms in ISO/IEC 11770.

In addition, or alternatively, it may comprise information such as maps, contact information, shopping information, etc. depending upon the predefined area in which the system is located. Some or all of the provided information may also be displayed on a screen or monitor.

The user's personal computing apparatus may comprise a smartcard, in which case the system comprises a smartcard reader. However, the user's personal computing apparatus may alternatively comprise a PDA, mobile phone, USB token (i.e. a reader-less smartcard), and the like. The integrity of the information system computing platform can preferably be verified via the user's personal computing apparatus. In one embodiment of the invention, the system is preferably arranged to verify the identity of the user before providing the requested information.

BRIEF DESCRIPTION OF THE DRAWINGS

An embodiment of the present invention will now be described by way of example only and with reference to the accompanying drawings, in which.

DETAILED DESCRIPTION OF THE INVENTION

In the following description, numerous specific details are set forth in order to provide a thorough understanding of the present invention. It will be apparent, however, to one skilled in the art, that the invention may be practiced without limitation to these specific details. In other instances, well known methods and structures have not been described in detail so as to avoid unnecessarily obscuring the present invention.

Figure 1:
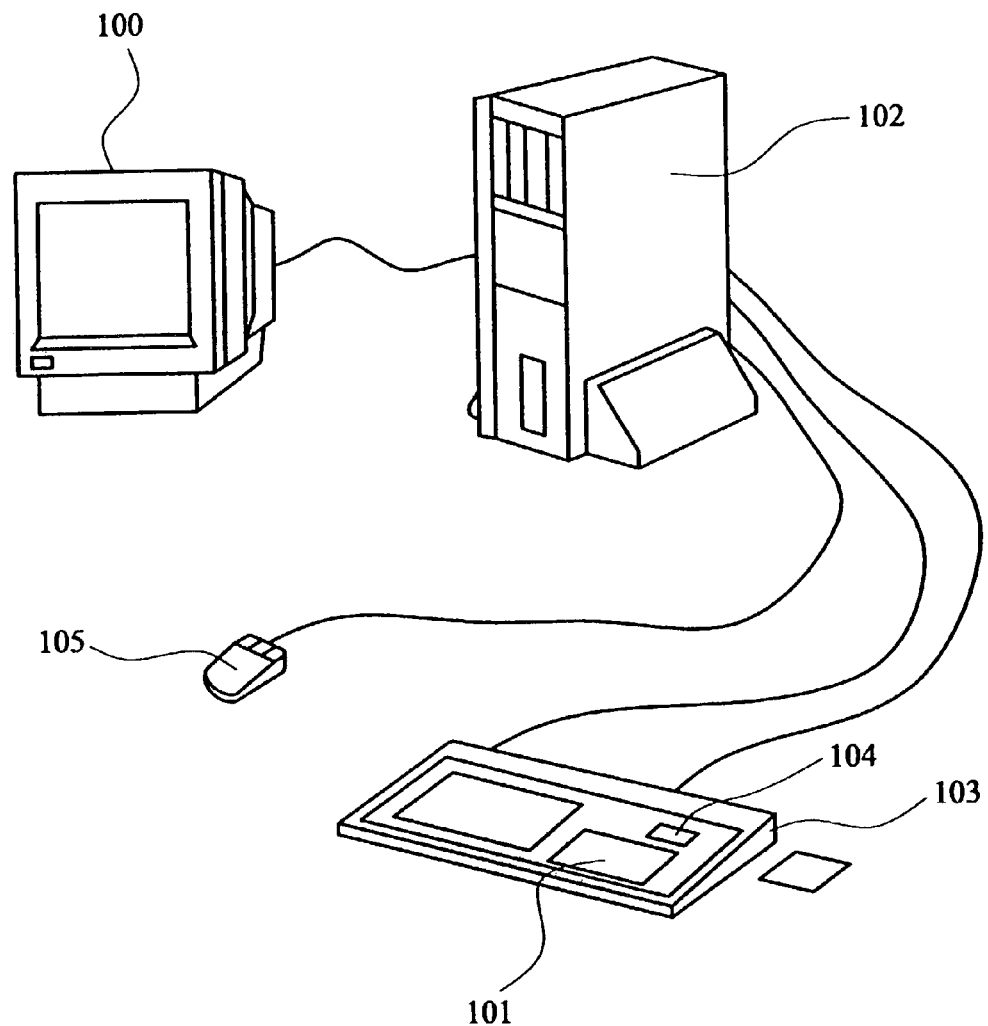
FIG. 1 illustrates schematically a trusted computing platform as previously described in the applicant's European patent application entitled 'Trusted Computing Platform' filed Feb. 15, 1999.
Figure 2:
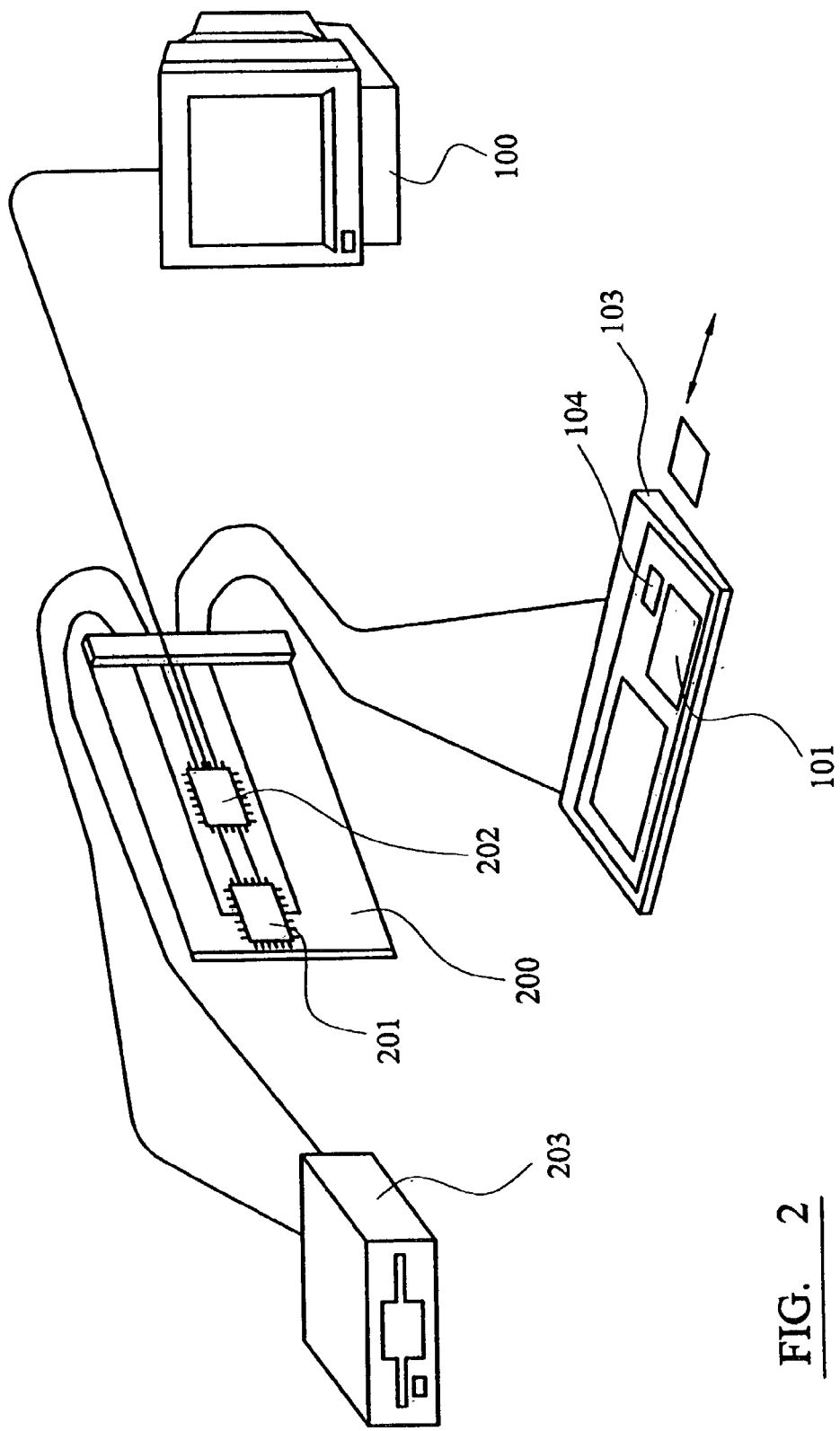
FIG. 2 illustrates schematically connectivity of selected components of the computing platform of FIG. 1.
Figure 3:
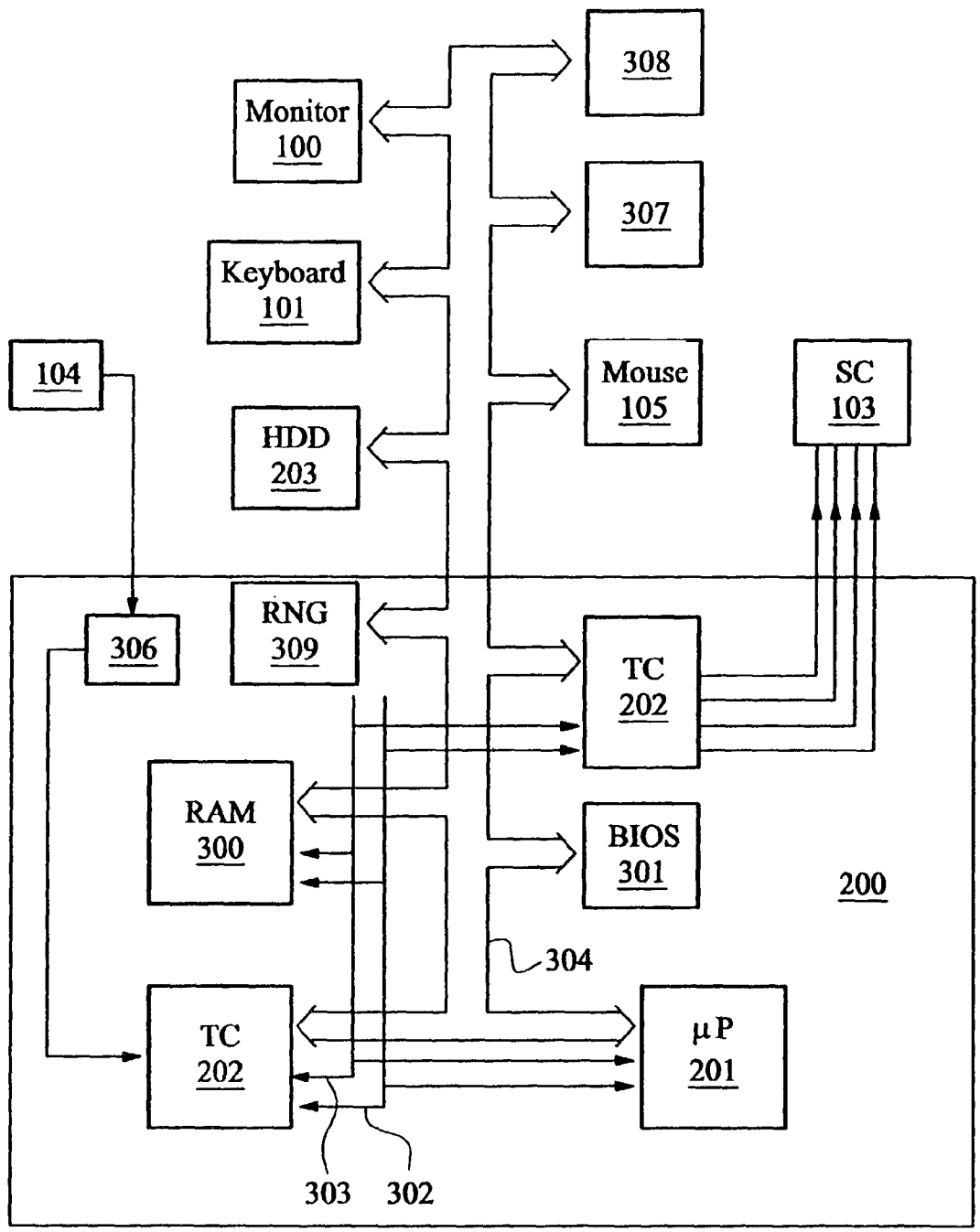
FIG. 3 illustrates schematically a hardware architecture of components of the computing platform of FIG. 1.
Figure 4:
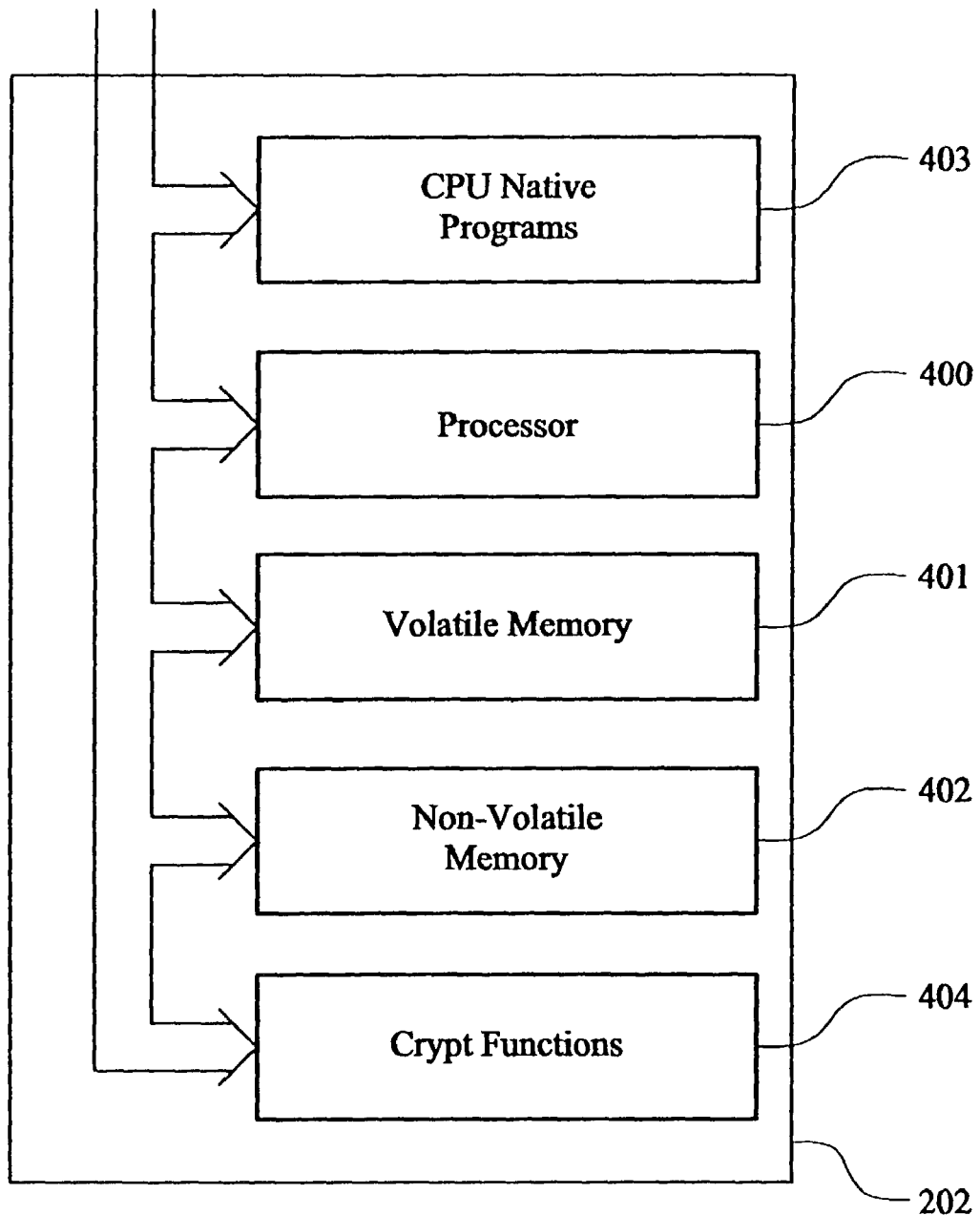
FIG. 4 illustrates schematically and architecture of a trusted component comprising the computing platform of FIG. 1.

Referring to FIG. 1 of the drawings, there is illustrated schematically one example of a trusted computing platform as previously described in the applicant's co-pending European patent application entitled 'Trusted Computing Platform' filed Feb. 15, 1999. Referring to FIG. 2, there is illustrated schematically the physical connectivity of some of the components of the trusted computer platform of FIG. 1. Referring to FIG. 3, there is illustrated schematically an architecture of the trusted computing platform of FIGS. 1 and 2, showing physical connectivity of components of the platform. Referring to FIG. 4, there is illustrated schematically an architecture of a trusted component included in the computer platform of FIG. 1.

In the example shown in FIGS. 1 to 4, the trusted computing platform is shown in the form of a personal computer suitable for domestic or business use. However, it will be understood by those skilled in the art that this is just one specific example of a trusted computing platform, and other example may take the form of a palmtop computer, a laptop computer, a server-type computer, a mobile phone-type computer, information appliances, communication devices, display devices and hard copy devices generally, and the like, and the invention is limited only by the scope of the appended claims.

In the example illustrated by FIG. 1, the computing platform comprises a display monitor 100, a keyboard data entry means 101, a casing 102 comprising a motherboard on which is mounted a data processor, one or more data storage means, a dynamic random access memory, various input and output ports (not illustrated in FIG. 1), a smart card reader 103 for accepting a user's smart card, a confirmation key 104, which a user can activate when confirming a transaction via the trusted computing platform, and a pointing device, e.g. a mouse or trackball device 105. The trusted computing platform also has a trusted component as described in the applicant's previous disclosure and as further described herein.

Referring to FIG. 2 of the drawings, there are illustrated some of the components included in the trusted computing platform, including keyboard 101 which incorporates confirmation key 104 and a smart card reader 103, a main motherboard 200 on which is mounted first data processor 201 and trusted component 202, and example of a hard disk drive 203, and monitor 100. Additional components which may be included in the computing platform, such as an internal frame to the casing 102 housing one or more local area network (LAN) ports, one or more modem ports, one or more power supplies, cooling fans, and the like, are not shown in FIG. 2.

Referring to FIG. 3 of the drawings, main motherboard 200 is manufactured comprising a processor 201, and a preferably permanently fixed trusted component 202, a memory device 300 local to the processor, a BIOS memory area 301, smart card interface 305, a plurality of control lines 302, a plurality of address lines 303, a confirmation key interface 306, and a databus 304 connecting the processor 201, trusted component 202, memory area 300, BIOS memory area 301 and smart card interface 305. A hardware random number generator 309 is also able to communicate with the processor 201 using the bus 304.

External to the motherboard and connected thereto by the databus 304, are provided one or more hard disk drive memory devices 203, keyboard data entry device 101, pointing device 105, monitor 100, smart card reader 103, and one or more peripheral devices 307, 308, for example, a modem, printer, scanner, or other known peripheral device.

In the illustrated example, smart card reader 103 is wired directly to smart card interface 305 on the motherboard and does not connect directly to the databus 304. In an alternative example, however, the smartcard reader 103 may be connected directly to databus 304. To provide enhanced security, confirmation key switch 104 is hard wired directly to confirmation key interface 306 on motherboard 200, which provides a direct signal input to trusted component 202 when confirmation key 104 is activated by a user such that a user activation the confirmation key sends a signal directly to the trusted component, by-passing the first data processor and first memory means of the computer platform.

Trusted component 202 is positioned logically and physically between monitor 100 and processor 201 of the computing platform, so that trusted component 202 has direct control over the views displayed on monitor 100 which cannot be interfered with by processor 201.

Confirmation key 104 and confirmation key driver 306 provide a protected communication path (PCP) between a user and the trusted component, which cannot be interfered with by processor 201, which by-passes databus 304 and which is physically and logically unconnected to memory area 300 or hard disk drive memory device(s) 203.

The trusted component lends its identity and trusted processes to the computer platform and the trusted component has those properties by virtue of its tamper-resistance, resistance to forgery, and resistance to counterfeiting, only selected entities with appropriate authorisation mechanisms are able to influence the processes running inside the trusted component. Neither an ordinary user of the trusted computer entity, nor any ordinary user or any ordinary entity connected via a network to the computer entity may access or interfere with the processes running inside the trusted component. The trusted component has the property of being "inviolate".

In the illustrated example, the trusted component operates to monitor data, including user data files and applications, on the computer platform by creating a set of data files which the trusted component dynamically monitors for any changes in the data, including absence of the data, which may occur as a result of the computer platform being compromised by a virus attack, or other interference. The trusted component is allocated or seizes a plurality of memory location addresses and/or file directories in the first memory area of the computer platform, which become a user space reserved for use by the trusted component.

The reserved memory area comprises a selected proportion of the total memory area of the computer platform. Within the reserved memory area, the trusted component also creates a plurality of data files, which can either be copies from real user data files on the computer platform, or which can be created by the trusted component. The primary purpose of these files is to act as a set of files to which the trusted component has access, and to which ordinary user accounts of the computer platform, under normal operation, do not have access. Because the files in the reserved memory area are reserved for use by the trusted component and under normal operation, are not accessed by applications on the computer platform, the trusted component can use files stored in the reserve memory area as a "control" set of files by which to monitor unauthorised changes to the data, for example as caused by a virus.

Because the files stored in the reserved memory area are either duplicates of user files, duplicates of applications or files created specifically by the trusted component, they are of little or no value to the computer platform for performing its normal operating functions. If the files in the reserve memory area become corrupted for any reason, they may be sacrificed and are easily replaceable. However, since access to the reserve memory area is restricted to the trusted component, any corruption of the files in the reserve memory area is deemed to be indicative of changes to files occurring through undesirable mechanisms, e.g. by a virus program. The files in the reserve memory area are periodically monitored by the trusted component to check for such corruption. If corruption is discovered by the monitoring process, then a measure of the likely corruption of the remaining memory area on the computer platform can be determined by probabilistic methods.

By providing a reserve memory area containing files which can be sacrificed, if the computer platform is compromised by a hostile attack, e.g. a virus, then the sacrificial files stored in the reserve memory area are at least as likely to be affected as other user data files stored in the remaining portion of the memory of the computer platform. Thus any corruption of the files in the reserve memory area, if detected early enough, may give an indication to the trusted component that file corruption is occurring on the computer platform, in which case the trusted component can take action to limit the spread of corruption at an early stage, and preferably before damage is done to important data files stored in the remaining memory area of the computer platform.

Referring to FIG. 4 of the drawings, there is illustrated schematically an internal architecture of trusted component 202. The trusted component comprises a processor 400, a volatile memory area 401, a non-volatile memory area 402, a memory area storing native code 403, and a memory area storing one or a plurality of cryptographic functions 404, the non-volatile memory 401, native code memory 403 and cryptographic memory 404 collectively comprising the second memory means hereinbefore referred to. The cryptographic functions 404 may include or comprise a source of random numbers.

Trusted component 202 comprises a completely independent computing entity from the computer platform. In the illustrated example, the trusted component shares a motherboard with the computer platform so that the trusted component is physically linked to the computer platform. In a preferred embodiment, the trusted component is physically distinct from the computer platform, that is to say it does not exist solely as a sub-functionality of the data processor and memory means comprising the computer platform, but exists separately as a separate physical data processor 400 and separate physical memory area 401, 402, 403, 404. By providing a physically separate trusted component, the trusted component becomes more difficult to mimic or forge through software introduced onto the computer platform. Programs within the trusted component are pre-loaded at manufacture of the trusted component, and are not generally user configurable. The physicality of the trusted component, and the fact that the trusted component is not configurable by the user enables the user to have confidence in the inherent integrity of the trusted component, and therefore a high degree of "trust" in the operation and presence of the trusted component on the computer platform.

The user's smart card may comprise a "cash card" or a "crypto card", the functions of which are described in the applicant's above-mentioned previous disclosure 'Computing Apparatus and Methods of Operating Computing Apparatus'.

On each individual smart card may be stored a corresponding respective security data which is different for each smart card. For user interactions with the trusted component, e.g. for a dialogue box monitor display generated by the trusted component, the trusted component takes the security data (e.g. image data) from the user's smart card, and displays it in, or uses it as a background to the dialogue box displayed on the monitor 100. Thus, the user has confidence that the dialogue box displayed on the monitor 100 is generated by the trusted component.

Figure 5:
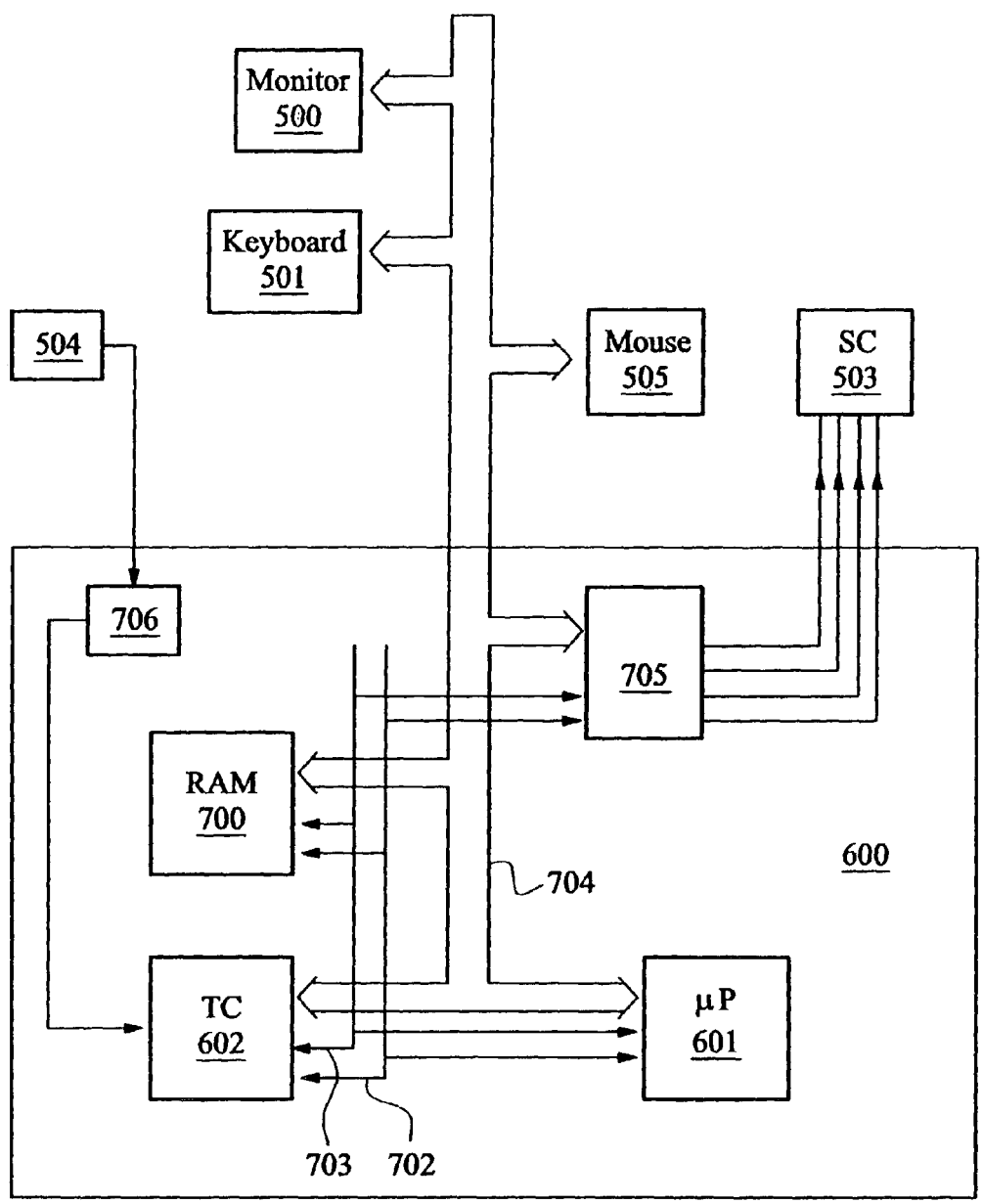
FIG. 5 illustrates schematically a hardware architecture of components of an exemplary embodiment of an information system according to the present invention.

Referring to FIG. 5 of the drawings, an exemplary embodiment of an information system according to the present invention is based on the trusted computing platform principle described above. Thus, the information system comprises at least a monitor or screen 500, an input entry device, such as a keyboard, 501 and/or a pointing device, such as a mouse or trackball device, 505, a smart card reader 503, a confirmation key 504, and a main motherboard 600.

The main motherboard may be manufactured comprising a processor 601, a preferably permanently fixed trusted component 602, a memory device 700 local to the processor 601, a smart card interface 705, one or more control lines 702, one or more address lines 703, a confirmation key interface 706, and a databus 704 connecting the processor 601, trusted component 602, memory area 700, and smart card interface 705.

Figure 6:
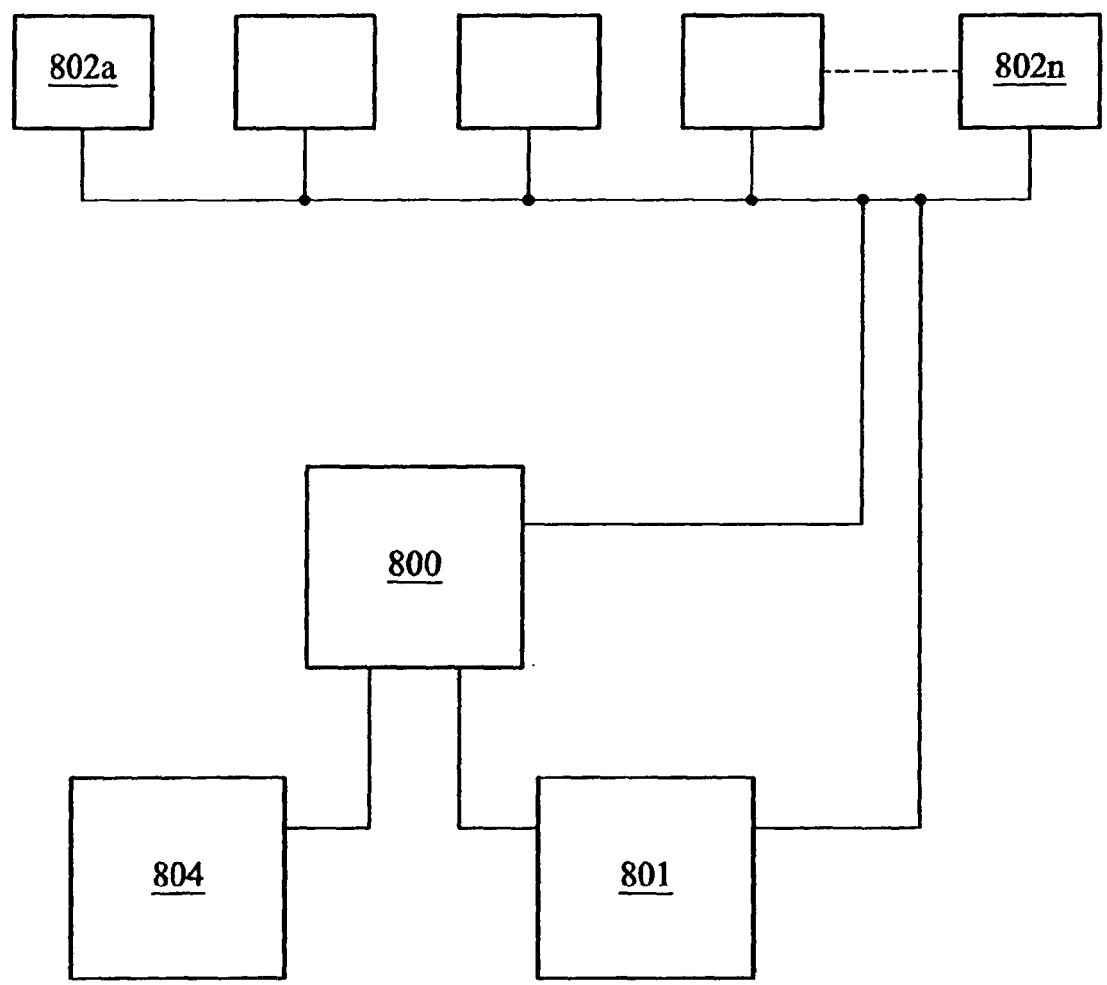
FIG. 6 illustrates schematically an exemplary embodiment of an information system according to the present invention.

Referring to FIG. 6 of the drawings, the information system 800 of FIG. 5 is located in a prominent position in the predetermined area of interest, e.g. at the reception desk of a building, and is connected to, or includes integrally therein, a database 801 in which is stored information relating to computing platforms within the building and their security attributes. The information system may also be linked or connected to one or more of the computing platforms 802a-802n, and optionally to an external link 804 such as the Internet.

In use, a visitor to a building first identifies an information system according to the invention, which may be accompanied by some form of written statement by the service provider attesting the trustworthiness of the system. Thus, the statement may read "Organisation XYZ attests that this equipment is a Trusted System. This means that the organisation has taken every reasonable step to ensure the trustworthiness of information provided or published by the system, to ensure the trustworthiness of the verification services provided by the system and to ensure that the system maintains the privacy of its users".

Having located the information system, the visitor presents his/her personal computing platform or apparatus to the system and authorises the personal computing apparatus to interact with the information system. The personal computing apparatus could, for example, be a smart card or laptop computer. Communications between the system and the personal computing apparatus must be unambiguous, i.e. it must be obvious which information system is communicating with the computing apparatus. Thus, the system must be a contact device or use, for example, directional wireless communication, such as IR. In any event, if the personal computing apparatus is a smart card, the interaction authorisation step may consist of entering into the information system a Personal Identification Number (PIN) which is then forwarded to the smart card for verification.

In some circumstances, such as within the premises of a private organisation, it may be desirable for the information system to verify the identity of the visitor before commencing communication. Such verification may take the form of a cryptographic challenge by the information system, i.e. a request for a password or code to be entered, in response to which the visitor (or his/her personal computing apparatus) must enter the correct password or code before communication will continue. This step may, however, be unnecessary or undesirable in public buildings such as libraries and museums, for example.

Once the authorisation and verification process has been completed, the information system provides information about computer platforms within the building, together with their security attributes where appropriate, and also indicates any additional services which the system provides. At least the information regarding the additional services available to the visitor is preferably presented on the monitor or screen of the system, although, the system itself may not have a screen, in which case such information may be displayed on the screen of the visitor's personal computing apparatus, where appropriate. In any event, the system provides the information regarding computer platforms within the predetermined area to the visitor's personal computing apparatus.

The additional services offered by the information system may permit the visitor to perform operations on the information provided by the system and/or to perform remote operations upon the information provided by the system, and report the results back to the visitor. For example, the information system may have greater computational power than the visitor's personal computing apparatus, in which case, the visitor may ask the information system to communicate with another service of the visitor's choosing (e.g. the visitor's smart card may ask the system to send the provided information to a service that is trusted by the visitor). The service would examine the information and return the results to the information system, which would forward the results to the visitor's personal computing apparatus. Of course, the information provided to the visitor may depend on the identity and/or level of authorisation of the visitor.

The visitor can then use the information provided by the information system during his/her visit to the building (or other predetermined area) of interest. When leaving the building, the visitor may once again present their personal computing apparatus to the information system so that the system can erase the building information from the visitor's personal computing apparatus. In any event, the system is preferably arranged to not to retain any unnecessary information relating to the visitor, thereby maintaining a high degree of privacy for the visitor.

In one particularly preferred exemplary embodiment of the invention, the information system is arranged to only provide details of trusted computing platforms within the predetermined area of interest. The visitor's personal computing apparatus (preferably a smart card or the like) may ask the information system to send that information to the visitor's verification service, which does the computationally intensive work of verifying identities and their associated certificates. The verification service would sign its conclusions and send the results back to the visitor's personal computing apparatus via the information system, so that the visitor's personal computing apparatus can then identify the platforms in the area which can be trusted by the visitor.

In general, the implementation of the information system of the invention must be trustworthy and, as such, should be designed and built such that its operations cannot be subverted. It may, for example, be incapable of executing any function other than one built into it. It may have physical protection to minimise the chance of physical alteration and/or it may periodically execute a self-test algorithm and report the result to a control centre. Alternatively or additionally, it may periodically execute a cryptographic challenge /response protocol to a control centre to request permission to operate, and stop operating if such permission is not forthcoming.

Embodiments of the present invention have been described above by way of examples only and it will be apparent to persons skilled in the art that modifications and variations can be made to the described embodiments without departing from the scope of the invention as defined by the appended claims.

The invention claimed is:

1. An information system comprising an information access point relating to at least one pre-determined geographical area, said information access point including apparatus for retrieving information relating to trusted computing platforms located within said pre-determined geographical area, said information system being arranged to provide said information relating to the trusted computing platforms located within the pre-determined geographical area to a portable computing apparatus visiting the pre-determined geographical area, wherein providing said information to the portable computing apparatus enables the portable computing apparatus to interact with trusted components of said trusted computing platforms within the pre-determined geographical area.

2. A system according to claim 1, wherein said information system is arranged to provide to the portable computing apparatus as said information only details and/or a list of public keys of genuine trusted computing platforms within said pre-determined geographical area.

3. A system according to claim 1, wherein said information access point comprises a trusted computing platform.

4. A system according to claim 1, comprising apparatus for communicating or interacting with the portable computing apparatus.

5. A system according to claim 4, wherein said apparatus for communicating or interacting with the portable computing apparatus is arranged to perform said communication or interaction by physical contact or directional wireless communication.

6. A system according to claim 1, incorporating or accompanied by a declaration concerning the trustworthiness of the system.

7. A system according to claim 6, wherein said declaration is capable of interpretation by a user of the portable computing apparatus without preprocessing by an information processing system.

8. A system according to claim 1, arranged to verify the identity of a user.

9. A system according to claim 1, arranged to enable a user to perform operations, either locally or remotely, upon the information that the system provided to the portable computing system.

10. A system according to claim 1, wherein the information provided to the portable computing apparatus includes security attributes of the trusted computing platforms within said pre-determined geographical area.

11. A method comprising: providing an information access point for a geographical area; retrieving to the information access point information relating to trusted computing platforms within the geographical area; and the information access point providing the information relating to the trusted computing platforms within the geographical area to a portable computing apparatus visiting the geographical area, wherein the information provided to the portable computing apparatus enables the portable computing apparatus to interact with trusted components of said trusted computing platforms.

12. The method of claim 11, wherein providing the information relating to the trusted computing platforms within the geographical area comprises providing to the portable computing apparatus only information relating to genuine trusted computing platforms within the geographical area.

13. The method of claim 12, wherein providing the information relating to the trusted computing platforms within the geographical area comprises providing to the portable computing apparatus a list of public keys of the genuine trusted computing platforms within the geographical area.

14. The method of claim 11, wherein providing the information relating to the trusted computing platforms within the geographical area to the portable computing apparatus comprises the information access point communicating with the portable computing apparatus when the portable computing apparatus is in physical contact with the information access point.

15. The method of claim 11, wherein providing the information relating to the trusted computing platforms within the geographical area to the portable computing apparatus comprises the information access point communicating with the portable computing apparatus when the portable computing apparatus is in position for directional wireless communication with the information access point.

16. The method of claim 11, further comprising the portable computing apparatus using said information from the information access point to interact with a trusted component of one of said trusted computing platforms within the geographical area.

17. The method of claim 11, further comprising: the portable computing apparatus requesting that a verification service verify the information relating to the trusted computing platforms within the geographical area; the verification service verifying identities of the trusted computing platforms, signing results, and returning signed results to the portable computing apparatus; and the portable computing apparatus using the signed results to identify which of the trusted computing platforms can be trusted.

18. A system comprising: one or more trusted computing platforms located within a geographical area; and an information access point in the geographical area, the information access point including an apparatus for retrieving information needed for interaction with trusted components of the trusted computing platforms and an interface arranged to provide the information needed for interaction with trusted components of the trusted computing platforms to a portable computing apparatus visiting the geographical area.

19. The system of claim 18, wherein the interface comprises at least one of a contact reader and a directional wireless communication interface through which the portable computing apparatus can communicate with the information access point.

20. The system of claim 18, wherein the information needed for interaction with trusted components of the trusted computing platforms includes public keys associated with the trusted computing platforms within the geographical area.

* * * * *